July 20, 1965   R. L. CHOLVIN ETAL   3,195,805
TURBOCHARGER DIFFERENTIAL PRESSURE CONTROL
Filed Oct. 25, 1961
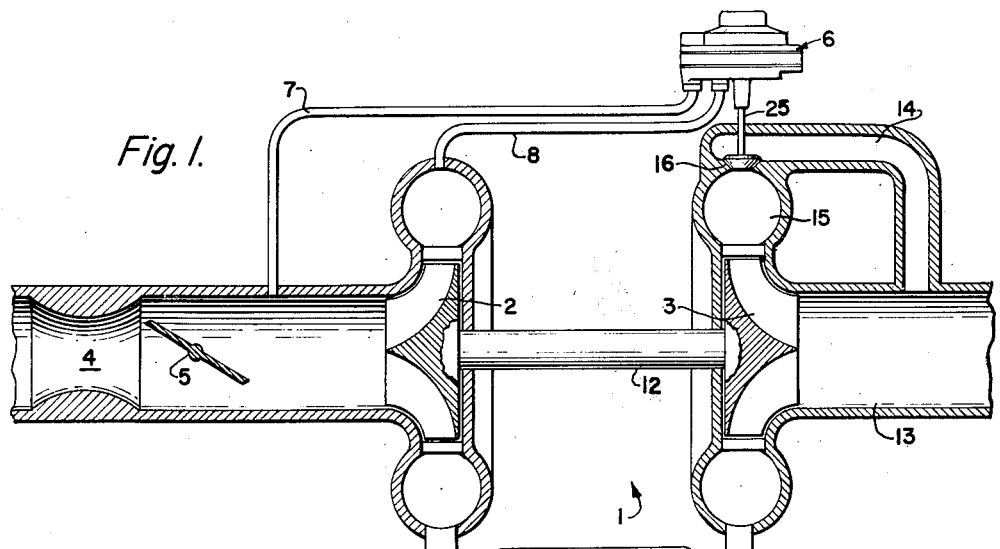
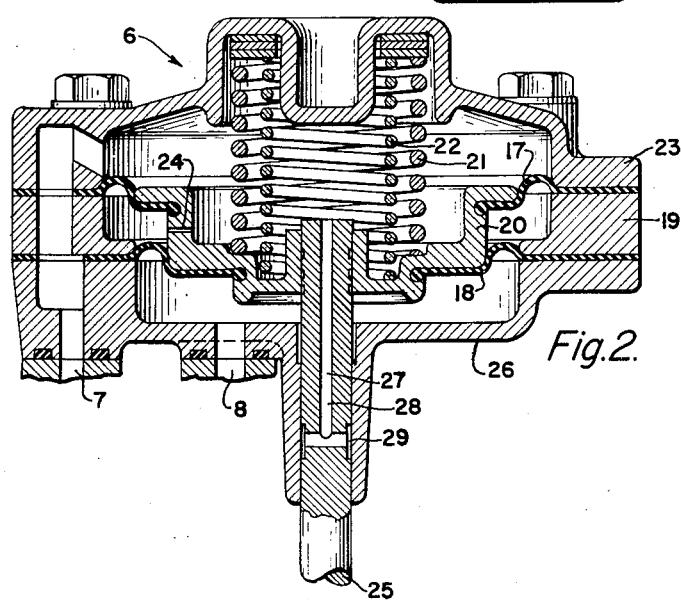
INVENTORS:
ROBERT L. CHOLVIN,
ALEXANDER SILVER,
BY Thomas D. Linton
Attorney.

United States Patent Office 3,195,805
Patented July 20, 1965

3,195,805
TURBOCHARGER DIFFERENTIAL PRESSURE CONTROL
Robert L. Cholvin, El Segundo, and Alexander Silver, Tarzana, Calif., assignors to The Garrett Corporation, Los Angeles, Calif., a corporation of California
Filed Oct. 25, 1961, Ser. No. 147,611
10 Claims. (Cl. 230—9)

This invention relates to a turbocharger differential pressure control and, more particularly, to a pressure control system which provides for a rapid rise in turbocharger boost pressure supplied to an internal combustion engine intake manifold, and which maintains intake manifold pressure within predetermined values over a wide range of engine speeds.

In operating an internal combustion engine over a wide range of engine speeds both the torque and horsepower of the engine may be increased by supplying air under pressure to the engine intake manifold. Also, optimum conditions for the mixture of fuel and air within the engine may be obtained by supplying air under pressure to the engine intake manifold. In order to provide an internal combustion engine with an adequate supply of air having a predetermined pressure range, a turbocharger, consisting of a compressor unit driven by an engine exhaust gas turbine, has been provided to supply compressed air to the engine. The compressor unit receives ambient air and increases its pressure before supplying air to the engine intake manifold. An important factor effecting the output of the compressor is the pressure of ambient air introduced into the compressor. Another factor effecting the output of the compressor is the loss of air pressure caused by the flow of air from the atmosphere to the compressor.

Accordingly, an important object of this invention is to provide a control system which produces a rapid rise in the pressure of air supplied to an internal combustion engine.

Another object of this invention is to provide a control system which effects the operations of a turbocharger compressor so that a predetermined range of pressures is maintained in an engine intake manifold over a wide range of engine speeds and variations in ambient pressure.

A further object of this invention is to provide a control system which will insure that a turbocharger compressor unit will supply air to an engine intake manifold at a predetermined pressure range above atmospheric pressure under wide-open engine throttle conditions.

A further object of this invention is to provide a control system which will insure the rapid rise in engine intake manifold pressure for a rapid acceleration of an internal combustion engine.

Another object of this invention is to provide a control system for a tubrocharger wherein the pressure differential between compressor intake and discharge is limited to a predetermined amount.

That these and other objects and advantages of the invention are attained will be readily apparent from a consideration of the following description when taken in conjunction with the drawings, in which:

FIG. 1 is a schematic diagram of the turbocharger boost pressure control system; and FIG. 2 is a partially cross-sectional view of the bypass valve actuating assembly.

Referring to FIG. 1 of the drawings, a turbocharger assembly 1 is shown as having a compressor unit 2 and a turbine unit 3. Ambient air passes through compressor intake conduit 4, past a throttling valve 5 and thence into compressor 2. Air pressure in conduit 4 communicates with a bypass valve actuating assembly 6 through a conduit 7. Compressor discharge pressure communicates with actuating assembly 6 through a conduit 8. Actuating assembly 6 is shown in cross-sectional detail in FIG. 2.

Air from compressor 2 passes to an intake manifold 9 for an internal combustion engine 10. Exhaust gases from engine 10 pass through conduit 11 into turbine 3. Turbine 3 is driven by engine exhaust gases flowing from internal combustion engine 10.

The rotational speed of turbine 3 controls the operation of compressor 2 since turbine 3 drives the compressor 2 through drive shaft 12. After exhaust gases from engine 10 have transferred energy to the turbine blading of turbine 3, the exhaust gases are vented to atmosphere through exhaust conduit 13. A bypass conduit 14 is connected to the intake scroll 15 of turbine 3. A bypass valve 16 is located between turbine scroll 15 and bypass conduit 14. The movement of bypass valve 16 is controlled by actuating assembly 6. Under certain pressure conditions, as will be more fully explained hereinafter, bypass valve 16 opens, and exhaust gases from engine 10 are vented to atmosphere through bypass conduit 14 and exhaust conduit 13. When bypass valve 16 is open, less energy from engine exhaust gases is available for operating turbine unit 3. Thus the operational speed of turbine unit 3 is thereby controlled.

Under initial engine starting conditions bypass valve 16 remains closed so that turbine 3 comes up to rated speed rapidly. Thus, compressor 2 is capable of providing a rapid rise in air pressure supplied to the intake manifold 9 of internal combustion engine 10. After initial operating conditions for engine 10 have been established, an optimum pressure condition for air supplied to the engine intake manifold is maintained over a wide range of engine speeds and variations in ambient pressure.

Referring to FIG. 2, it is seen that compressor intake pressure is communicated to the upper side of the actuating assembly 6, while compressor discharge pressure communicates with the lower side of the actuating assembly. Actuating assembly 6 includes two diaphragm members 17 and 18, which are connected to the actuating assembly housing structure 19 and to a movable retaining member 20. Spring members 21 and 22 are mounted on retaining member 20 and the opposite ends of spring members 21 and 22 are seated in housing structure 23 so as to urge retaining member 20 in a downward direction as viewed in FIG. 2. Compressor intake pressure is free to communicate with both sides of the diaphragm member 17 since a bleed orifice 24 is provided in retaining member 20.

Diaphragm member 17 is the secondary, or fail-safe diaphragm for the actuating assembly 6, as will be explained more fully hereinafter. Diaphragm 18 is the main actuating member upon which the pressure differential of compressor intake pressure and compressor discharge pressure acts so as to effect movement within the actuating assembly 6, and thus, control movement of bypass valve 16. The adjustment of spring members 21 and 22 and the selection of a proper configuration and area for diaphragm members 17 and 18 will determine the conditions of pressure differential which will be maintained by actuating assembly 6. Valve 16 is positioned in accordance with the relationship of $F=\Delta PA$ where F is the spring force exerted by spring members 21 and 22 tending to urge valve 16 into a closed position. $\Delta P$ is the compressor pressure differential acting on one of the diaphragm members, and A is the area of the diaphragm member which is responsive to compressor differential pressure. In the event of a failure in diaphragm member 18 due to fatigue, deterioration of material, or excessive pressure conditions, the diaphragm member 17 will control the operational position of valve 16. The response of diaphragm member 17 to compressor differential pressure will not be appreciably effected by air movement through orifice 24 since the diameter of orifice 24 is small and the escape of compressor discharge pressure into compressor intake pressure is insignificant.

Since diaphragm member 17 has a larger area than diaphragm member 18, a lower pressure differential, ΔP, acting on diaphragm member 17 will be capable of opposing spring force F and thus open bypass valve 16. Both the torque and horsepower of engine 10 will be effected by the opening of valve 16 in response to a lower compressor differential pressure since the pressure of air supplied to engine intake manifold 9 will be lowered. Thus, the operational failure of diaphragm member 18 will become readily apparent to the operator of the internal combustion engine.

A valve actuating shaft 25 is connected to retaining member 20. Shaft 25 moves with retaining member 20 and diaphragm members 17 and 18 so as to control the operational position of bypass valve 16.

Air discharged from compressor 2 has a higher pressure than ambient air pressure. Also, compressor discharge air is laden with fuel from the carburetor, not shown, which is upstream of the compressor 2. Since compressor discharge pressure communicates with the underside of diaphragm 18, and shaft member 25 extends from the underside of diaphragm 18 outwardly of housing structure 26, provision must be made to prevent the escape of fuel laden air to the atmosphere. The escape of fuel from actuating assembly 6 not only would decrease the operational efficiency of engine 10, but also would create a dangerous condition in that fire could possibly result from the escape of fuel from assembly 6. In order to insure that fuel will not escape from assembly 6, shaft 25 has been provided with an opening 27. Opening 27 terminates in a passage 28 which communicates with an annular groove 29.

Compressor discharge fluid which might flow to the atmosphere around shaft 25 will pass through annular groove 29, passage 28, and thence through opening 27 to the upper side of diaphragm 17 which is exposed to compressor intake pressure. Since compressor intake pressure is less than compressor discharge pressure fluid escaping from assembly 6 past shaft 25 will tend to flow through opening 27 into the region of lower pressure on the upper side of diaphragm member 17. Ambient air which might enter assembly 6 around shaft 25 will be passed through annular groove 29, passage 28, and thence through opening 27 to the upper side of diaphragm 17.

While a particular preferred embodiment of the invention has been disclosed it will be understood that the invention is not limited thereto as many variations will be readily apparent to those skilled in the art, and the invention is to be given its broadest possible interpretation consistent with the prior art.

Having thus described our invention, we claim:

1. A control system for a turbocharger of the type having a compressor driven by a turbine, comprising:
    (a) means for altering the flow of fluid supplied to the turbine so as to vary the pressure of fluid discharged from the compressor;
    (b) means for actuating said flow altering means, including first and second movable walls, defining a chamber between faces thereof;
    (c) means for applying turbocharger compressor intake pressure to the other face of one of said movable walls;
    (d) means for applying turbocharger compressor discharge pressure to the other face of the other of said movable walls;
    (e) means providing restricted communication between said chamber and said intake pressure applying means,
        said actuating means being responsive to the pressures applied to said other faces of said movable wall means and the pressure in said chamber to maintain a predetermined pressure differential between said turbocharger compressor intake and discharge pressures.

2. The control system of claim 1 further characterized in that the effective area of said first movable wall differs from that of said second movable wall.

3. The control system of claim 2 further characterized in that said first movable wall has the greater effective area, and is subject to compressor intake pressure.

4. A control system for a turbocharger of the type having a compressor driven by a turbine comprising:
    (a) means for altering the flow of fluid supplied to the turbine so as to vary the pressure of fluid discharged from the compressor;
    (b) means for actuating said flow altering means, including movable wall means disposed in an actuator housing structure and a shaft secured to said wall means and movable within a shaft journal disposed in a wall of said housing structure,
        said movable wall means defining with said housing structure first and second chambers;
    (c) means for applying turbocharger compressor intake and discharge pressures to said first and second chambers, respectively; and
    (d) passage means providing communication between said intake pressure applying means and a portion of said shaft journal for returning leakage from said second chamber along said shaft and journal back to said intake pressure applying means.

5. The control system of claim 4 further characterized in that said passage means comprises a bore in said shaft, one end of said bore opening into said first chamber.

6. The control system of claim 5 further characterized in that the other end of said bore communicates with an annular groove provided in said shaft.

7. A control system for a turbocharger of the type having a compressor driven by a turbine comprising:
    (a) means for altering the flow of fluid supplied to the turbine so as to vary the pressure of fluid discharged from the compressor;
    (b) means for actuating said flow altering means,
        said actuating means including at least two diaphragm members, a movable retaining member to which said diaphragms are attached, spring means mounted on said retaining member, and an actuating shaft connected to said retaining member and movable therewith for actuating said flow altering means,
        said retaining member being provided with an orifice so that pressure acting on both sides of at least one of said diaphragm members may be equalized;
    (c) means for transmitting said turbocharger compressor intake pressure to said actuating means; and
    (d) means for transmitting said turbocharger compressor discharge pressure to said actuating means,
        said actuating means being responsive to a pressure differential between said compressor intake and discharge pressures so as to maintain a predetermined pressure differential between said turbocharger compressor intake and discharge pressures.

8. A control system for a turbocharger of the type having a compressor driven by a turbine comprising:
    (a) means for altering the flow of fluid supplied to the turbine so as to vary the pressure of fluid discharged from the compressor;
    (b) means for actuating said flow altering means,
        said actuating means including first and second diaphragm members, a movable retaining member to which said diaphragm members are attached, spring means mounted on said retaining member for urging said member in one direction, and a shaft member attached to said retaining member for movement therewith, said retaining member being provided with an orifice so that pressure acting on both sides of one of said diaphragm members may be equalized, said shaft member being provided with a hollow bore and an annular groove communicating said hollow bore with the exterior of said shaft so that fluid adjacent said annular groove will pass through said shaft member to one side of one of said diaphragm members;

(c) means for transmitting said turbocharger compressor intake pressure to said actuating means; and (d) means for transmitting said turbocharger compressor discharge pressure to said actuating means, said actuating means being responsive to a pressure differential between said compressor intake and discharge pressures so as to maintain a predetermined pressure differential between said turbocharger compressor intake and discharge pressures.

9. A control system for a turbocharger of the type having a compressor driven by a turbine comprising:

(a) means for altering the flow of fluid supplied to the turbine so as to vary the pressure of fluid discharged from the compressor;

(b) means for actuating said flow altering means, said actuating means including a housing, first and second diaphragm members, a movable retaining member to which said diaphragm members are attached, spring means mounted on said retaining member for urging said retaining member in one direction, and a shaft member attached to said retaining member for movement therewith, said retaining member being provided with an orifice so that pressure acting on both sides of one of said diaphragm members may be equalized, said shaft member being provided with means for transmitting fluid adjacent said shaft and housing to one side of one of said diaphragm members;

(c) means for transmitting said turbocharger compressor intake pressure to said actuating means; and (d) means for transmitting said turbocharger compressor discharge pressure to said actuating means, said actuating means being responsive to a pressure differential between said compressor intake and discharge pressures so as to maintain a predetermined pressure differential between said turbocharger compressor intake and discharge pressures.

10. A control system for a turbocharger in accordance with claim 9 wherein the area of said first diaphragm member is larger than the area of said second diaphragm member.

References Cited by the Examiner
UNITED STATES PATENTS

| | | | |
|---|---|---|---|
| 603,425 | 5/98 | Cummings | 230—9 |
| 2,374,708 | 5/45 | Shoults | 230—114 |
| 2,565,482 | 8/51 | Dolza et al. | 60—13 |
| 2,645,409 | 7/53 | Lawler | 230—5 |
| 2,989,000 | 6/61 | Alcaro | 103—16 |
| 2,997,029 | 8/61 | Bennett et al. | 121—48 |
| 3,035,408 | 5/62 | Silver | 230—11 |
| 3,087,430 | 4/63 | Griswold | 103—97 |

LAURENCE V. EFNER, *Primary Examiner.*

JULIUS E. WEST, *Examiner.*